(12) United States Patent
Ito et al.

(10) Patent No.: US 8,379,724 B2
(45) Date of Patent: Feb. 19, 2013

(54) IMAGE CODING APPARATUS AND IMAGE CODING METHOD

(75) Inventors: Hiroaki Ito, Yokohama (JP); Tomokazu Murakami, Kokubunji (JP); Isao Karube, Yokohama (JP); Taku Nakamura, Yokohama (JP); Yusuke Yatabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1490 days.

(21) Appl. No.: 11/727,206

(22) Filed: Mar. 23, 2007

(65) Prior Publication Data
US 2007/0286284 A1 Dec. 13, 2007

(30) Foreign Application Priority Data
Jun. 8, 2006 (JP) .................................. 2006-159231

(51) Int. Cl.
*H04N 7/12* (2006.01)
*G06K 9/36* (2006.01)

(52) U.S. Cl. ................................... 375/240.16; 382/232

(58) Field of Classification Search ............. 375/240.16, 375/E7.209
See application file for complete search history.

(56) References Cited

U.S. PATENT DOCUMENTS

| | | | | |
|---|---|---|---|---|
| 4,937,666 A * | 6/1990 | Yang | ............................ | 348/413.1 |
| 5,488,482 A * | 1/1996 | Ueda et al. | ...................... | 386/265 |
| 5,489,949 A * | 2/1996 | Jeong et al. | ..................... | 348/699 |
| 5,539,466 A * | 7/1996 | Igarashi et al. | .......... | 375/240.15 |
| 5,652,629 A * | 7/1997 | Gonzales et al. | ............. | 348/699 |
| 5,680,483 A * | 10/1997 | Tranchard | ...................... | 382/239 |
| 5,719,630 A * | 2/1998 | Senda | ........................ | 375/240.17 |
| 5,767,907 A * | 6/1998 | Pearlstein | ................. | 375/240.25 |
| 5,841,474 A * | 11/1998 | Ueda et al. | ................ | 375/240.12 |
| 5,859,668 A * | 1/1999 | Aono et al. | .............. | 375/240.15 |
| 5,909,252 A * | 6/1999 | Ueda et al. | ............... | 375/240.12 |
| 7,751,476 B2 * | 7/2010 | Tanizawa et al. | ........ | 375/240.03 |
| 2003/0138047 A1* | 7/2003 | Orchard et al. | .......... | 375/240.13 |
| 2004/0028282 A1* | 2/2004 | Kato et al. | ..................... | 382/236 |

(Continued)

FOREIGN PATENT DOCUMENTS

| EP | 1 746 842 A1 | 1/2007 |
|---|---|---|
| JP | 11-289538 | 10/1999 |

(Continued)

OTHER PUBLICATIONS

Japanese Office Action, w/ partial English translation thereof, issued in Japanese Patent Application No. JP 2006-159231 Aug. 17, 2010.
G. Sullivan et al., "Rate-Distortion Optimization for Video Compression", Nov. 1998, p. 74-90, vol. 15, No. 6.

*Primary Examiner* — Saleh Najjar
*Assistant Examiner* — Shu Chun Gao
(74) *Attorney, Agent, or Firm* — McDermott Will & Emery LLP

(57) ABSTRACT

An image coding apparatus and an image coding method are provided for reducing arithmetic processing while keeping a high compression ratio. A coding process necessary for the bi-prediction motion search can be effectively reduced by determining a block size for a bi-prediction motion search or a center position for a motion search on the basis of a result of a motion search of a unidirectional prediction. Further, a compression ratio can be also kept as high as possible, because the block size or the center position are obtained on the basis of the result of the motion search of the unidirectional prediction.

2 Claims, 14 Drawing Sheets

U.S. PATENT DOCUMENTS

| | | | |
|---|---|---|---|
| 2004/0247187 A1* | 12/2004 | Tanaka et al. | 382/232 |
| 2005/0063468 A1 | 3/2005 | Shimizu et al. | |
| 2005/0207496 A1* | 9/2005 | Komiya et al. | 375/240.16 |
| 2006/0045186 A1* | 3/2006 | Koto et al. | 375/240.16 |
| 2008/0037642 A1* | 2/2008 | Tsuchiya et al. | 375/240.16 |

FOREIGN PATENT DOCUMENTS

| | | |
|---|---|---|
| JP | 2005-101811 A | 4/2005 |
| JP | 2005-244503 A | 9/2005 |
| WO | WO 2005/046072 A1 | 5/2005 |

* cited by examiner

FIG. 6

| BLOCK SIZE FOR BI-PREDICTION SEARCH | BLOCK NUMBER | CENTER VECTOR |
|---|---|---|
| 16×16 | 0 | (MV0x, MV0y) |
| 16×8 | 0 | (MV0x, MV0y) |
| 16×8 | 1 | (MV0x, MV0y) |
| 8×16 | 0 | (MV0x, MV0y) |
| 8×16 | 1 | (MV0x, MV0y) |
| 8×8 | 0 | (MV0x, MV0y) |
| 8×8 | 1 | (MV0x, MV0y) |
| 8×8 | 2 | (MV0x, MV0y) |
| 8×8 | 3 | (MV0x, MV0y) |

FIG. 7

| BLOCK SIZE FOR BI-PREDICTION SEARCH | BLOCK NUMBER | CENTER VECTOR |
|---|---|---|
| 16×16 | 0 | (MVave1x, MVave1y) |
| 16×8 | 0 | (MV1x, MV1y) |
|  | 1 | (MV2x, MV2y) |
| 8×16 | 0 | (MVave1x, MVave1y) |
|  | 1 | (MVave1x, MVave1y) |
| 8×8 | 0 | (MV1x, MV1y) |
|  | 1 | (MV1x, MV1y) |
|  | 2 | (MV2x, MV2y) |
|  | 3 | (MV2x, MV2y) |

FIG. 8

| BLOCK SIZE FOR BI-PREDICTION SEARCH | BLOCK NUMBER | CENTER VECTOR |
|---|---|---|
| 16×16 | 0 | (MVave2x, MVave2y) |
| 16×8 | 0 | (MVave2x, MVave2y) |
|  | 1 | (MVave2x, MVave2y) |
| 8×16 | 0 | (MV3x, MV3y) |
|  | 1 | (MV4x, MV4y) |
| 8×8 | 0 | (MV3x, MV3y) |
|  | 1 | (MV4x, MV4y) |
|  | 2 | (MV3x, MV3y) |
|  | 3 | (MV4x, MV4y) |

FIG. 9

| BLOCK SIZE FOR BI-PREDICTION SEARCH | BLOCK NUMBER | CENTER VECTOR |
|---|---|---|
| 16×16 | 0 | (MVave3x, MVave3y) |
| 16×8 | 0 | (MVave4x, MVave4y) |
| | 1 | (MVave5x, MVave5y) |
| 8×16 | 0 | (MVave6x, MVave6y) |
| | 1 | (MVave7x, MVave7y) |
| 8×8 | 0 | (MV5x, MV5y) |
| | 1 | (MV6x, MV6y) |
| | 2 | (MV7x, MV7y) |
| | 3 | (MV8x, MV8y) |

FIG.16
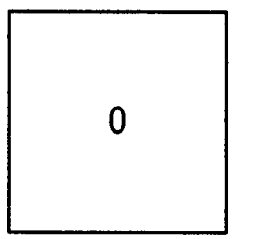
(1) 16×16
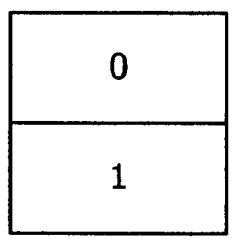
(2) 16×8
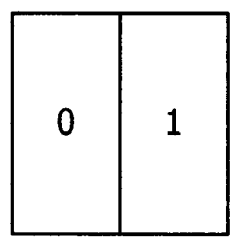
(3) 8×16
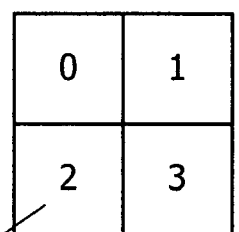
(4) 8×8
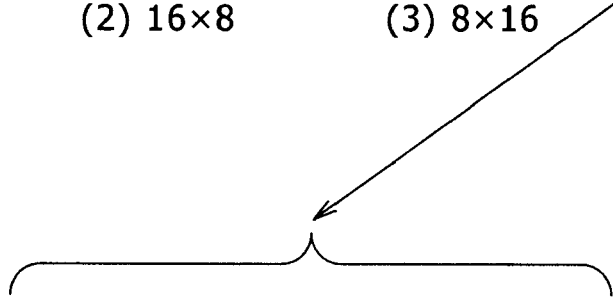
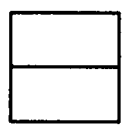
(5) 8×4
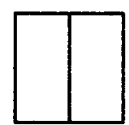
(6) 4×8
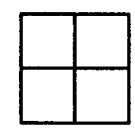
(7) 4×4

IMAGE CODING APPARATUS AND IMAGE CODING METHOD

CLAIM OF PRIORITY

The present application claims priority from Japanese application serial no. JP 2006-159231, filed on Jun. 8, 2006, the content of which is hereby incorporated by reference into this application.

BACKGROUND OF THE INVENTION (1) Field of the Invention

The present invention relates to image coding apparatuses and image coding methods by which a moving image is coded with high efficiency, and particularly to motion compensation inter prediction coding in which coding is performed using temporally-previous and temporally-subsequent images.

(2) Description of the Related Art

As a technique for coding moving image data such as TV signals with high efficiency for recording or transmission, a coding system such as the MPEG (Moving Picture Experts Group) system has been designed, and is an international-standard coding system as the MPEG-1 standard, the MPEG-2 standard, and MPEG-4 standard. Further, as a system of further improving a compression ratio, the H. 264/AVC (Advanced Video Coding) standard and the like have been established.

For the moving image coding, in general, two coding modes have been appropriately employed, such as an intra prediction coding mode in which a coded image in the same picture as a coding target image is used as a reference image, and a motion compensation inter prediction coding mode in which previous and subsequent pictures on the temporal axis are used as reference images.

The H. 264/AVC standard employs a data structure composed of hierarchies, as similar to the MPEG-2 standard, and a slice is used as a unit by which the intra prediction coding mode and the motion compensation inter prediction coding mode are switched to each other. While a picture is used as a unit by which coding modes are switched to each other in the MPEG-2 standard, the slice that is a low-order hierarchy next to the picture is used as a unit of switching the modes in the H. 264/AVC standard.

As for the above-described slices, a slice in which the intra prediction coding is performed is called I slice. In addition thereto, a slice in which the motion compensation inter prediction coding can be performed by referring to one reference image block in the previous coded picture on the temporal axis is called P slice. Further, in addition thereto, a slice in which the motion compensation inter prediction coding can be performed by referring to two reference image blocks of an arbitrary combination in the previous or subsequent coded picture on the temporal axis is called B slice.

Next, as a block size by which the inter prediction coding is performed is smaller, a detailed prediction can be performed. Thus, it is possible to minimize a difference between a coding target image and a prediction image. On the other hand, as a block size is smaller, motion vector information needs to be coded for each block. Thus, a coding amount is increased. Accordingly, a plurality of block sizes are provided in many moving image coding systems, and a technique for using the optimum block size while switching these sizes has been adopted.

As a technique for selecting the optimum coding mode, two systems of a simplified (non-RD-opt) system and a Rate-Distortion optimization (RD-opt) system are prepared in reference software provided by, for example, a standardization committee that is called JM (Joint Model). The reference software performs a process so that a coding cost is calculated by a certain formula for each mode, and a coding mode with the minimum coding cost is selected.

SUMMARY OF THE INVENTION

In the RD-opt system described in "Rate-Distortion Optimization for Video Compression", IEEE Signal Processing Magazine, vol. 15, no. 6, pp. 74-90, (November, 1998), coding/decoding processes such as calculation of a prediction error, DCT transform, quantization, calculation of generating coding amounts, inverse quantization, inverse DCT transform, and calculation of distortion amounts are necessary to be performed for each coding mode and each block size, which results in enormous amounts of arithmetic processing for coding. On the other hand, in the simplified (non-RD-opt) system, it is not necessary to perform the coding/decoding processes for each mode, which results in reduction of computing load as compared to the RD-opt system. Even in this case, the simplified (non-RD-opt) system is the same as the RD-opt system in a point that the coding cost is calculated for comparison for each coding mode and each block size. In the RD-opt system and the simplified (non-RD-opt) system, when a slice type is P slice, a motion search is performed within a search range of a motion vector only for a unidirectional prediction using a reference image block A. However, when a slice type is B slice, a motion search is performed for three kinds of predictions: (1) unidirectional prediction using a reference image block A as a reference image; (2) unidirectional prediction using a reference image block B as a reference image; and (3) bi-prediction using a reference image block A and a reference image block B as reference images, and then the coding cost is calculated, which results in enormous amounts of arithmetic processing.

The present invention provides an image coding apparatus and an image coding method for reducing arithmetic processing while keeping a high compression ratio.

According to the present invention, there is provided an image coding apparatus for coding an image by using one or more coded reference image block(s), the apparatus including: a first prediction motion search unit which outputs first coding cost information for coding on the basis of one reference block; and a second prediction motion search unit which outputs second coding cost information for coding on the basis of two reference blocks by using the first coding cost information output from the first prediction motion search unit, wherein the image coding apparatus performs coding of an image by using the first coding cost information and the second coding cost information.

According to the present invention, it is possible to provide an image coding apparatus and an image coding method for reducing arithmetic processing while keeping a high compression ratio.

BRIEF DESCRIPTION OF THE DRAWINGS

These and other features, objects and advantages of the present invention will become more apparent from the following description when taken in conjunction with the accompanying drawings wherein:

FIG. 6 is an explanatory view for one concrete example of a processing operation of a bi-prediction motion search center setting unit according to the third embodiment of the present invention;

FIG. 7 is an explanatory view for one concrete example of a processing operation of the bi-prediction motion search center setting unit according to the third embodiment of the present invention;

FIG. 8 is an explanatory view for one concrete example of a processing operation of the bi-prediction motion search center setting unit according to the third embodiment of the present invention;

FIG. 9 is an explanatory view for one concrete example of a processing operation of the bi-prediction motion search center setting unit according to the third embodiment of the present invention;

FIG. 16 is an explanatory view showing block sizes for motion compensation inter prediction coding in H. 264/AVC.

DETAILED DESCRIPTION OF THE PREFERRED EMBODIMENT

First, a motion compensation inter prediction coding mode will be described below in detail.

A technique in which a difference value between each pixel value in a coding target image and each pixel value corresponding to the same spatial position as the coding target image in a reference image is calculated and coded is called an inter prediction coding mode. The motion compensation inter prediction coding mode is a technique obtained by adding a motion compensation technique to the inter prediction coding. The motion compensation is a technique in which the coding target image is divided into a plurality of blocks, a prediction image is generated by estimating the amount of motion (motion vector) from the reference image for each coding target block, and a difference value (prediction error) between the coding target image and the prediction image is further minimized. When coded data is decoded on the decoding side, the motion vector information is also necessary. Therefore, the motion vector information as well as the prediction error is coded for recoding or transmission on the coding side.

Figure 12:
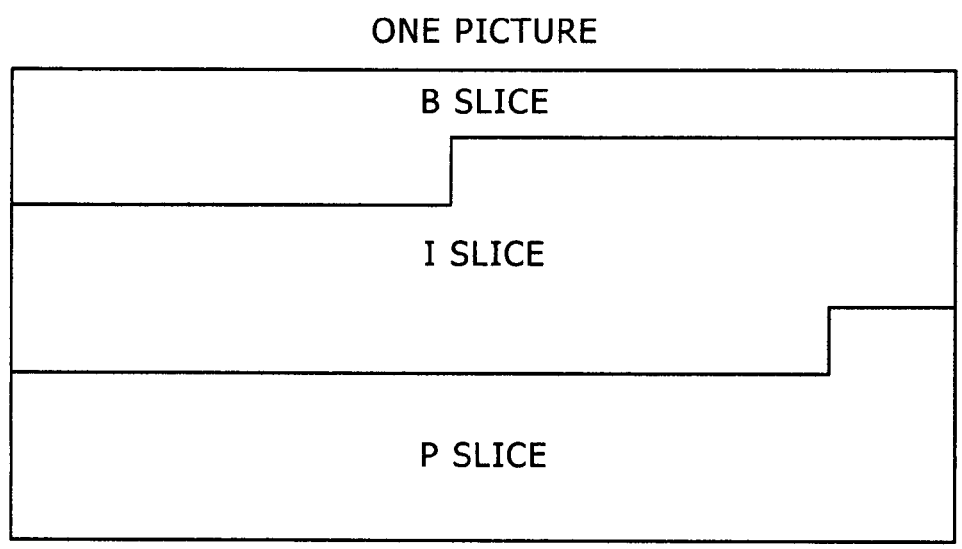
FIG. 12 is an explanatory view for schematically showing a data structure composed of slices in one picture.

FIG. 12 is a view schematically showing a data structure composed of slices in one picture. H. 264/AVC allows one picture to be divided into a plurality of slices as shown in FIG. 12, and I slice, P slice, and B slice are allocated to the respective slices. Coding is performed for each I slice, P slice, and B slice on an MB (macroblock) basis (namely, for each MB) that is a block in a low-order hierarchy of each slice. However, the coding mode that can be selected in any of the MBs differs depending on I slice, P slice, and B slice. Specifically, in the MB of I slice, only an intra prediction coding mode can be selected. In the MB of P slice, the intra prediction coding mode and the motion compensation inter prediction coding mode in which one reference image block in the previous reference picture on the temporal axis is referred to can be selected. In the MB of B slice, in addition to the intra prediction coding mode and the motion compensation inter prediction coding mode in which one reference image block in the previous reference picture on the temporal axis or one reference image block in the subsequent reference picture on the temporal axis is referred to, another motion compensation inter prediction coding mode in which two reference image blocks in the previous or subsequent reference picture on the temporal axis are referred to can be selected. Among these modes, the motion compensation inter prediction coding mode in the case of using two reference image blocks will be described below in more detail.

Figure 13:
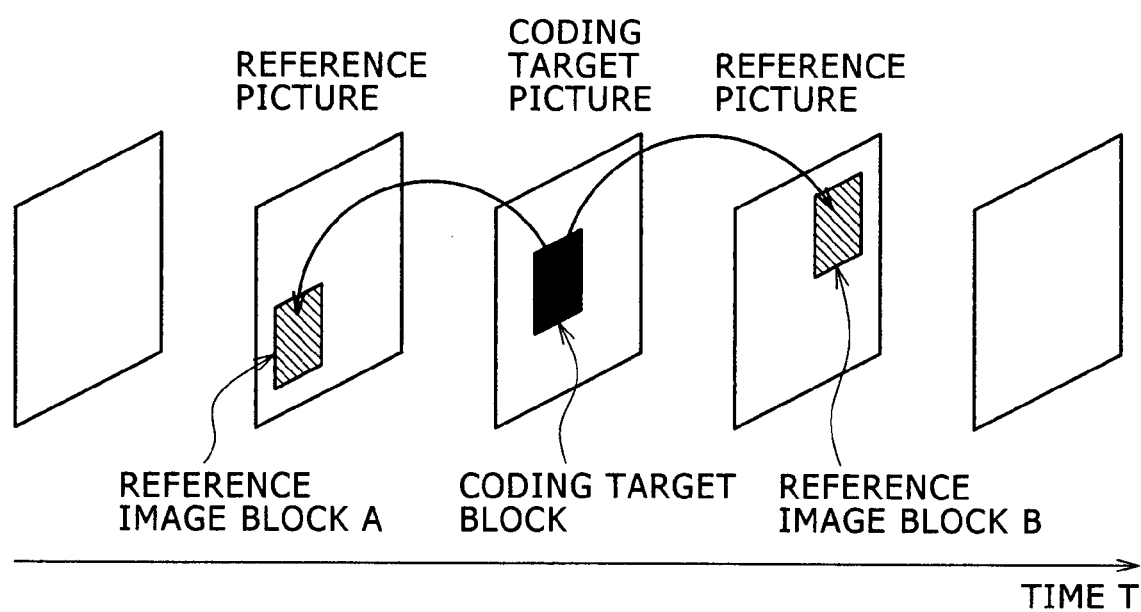
FIG. 13 is an explanatory view showing a bi-prediction operation in H. 264/AVC.
Figure 14:
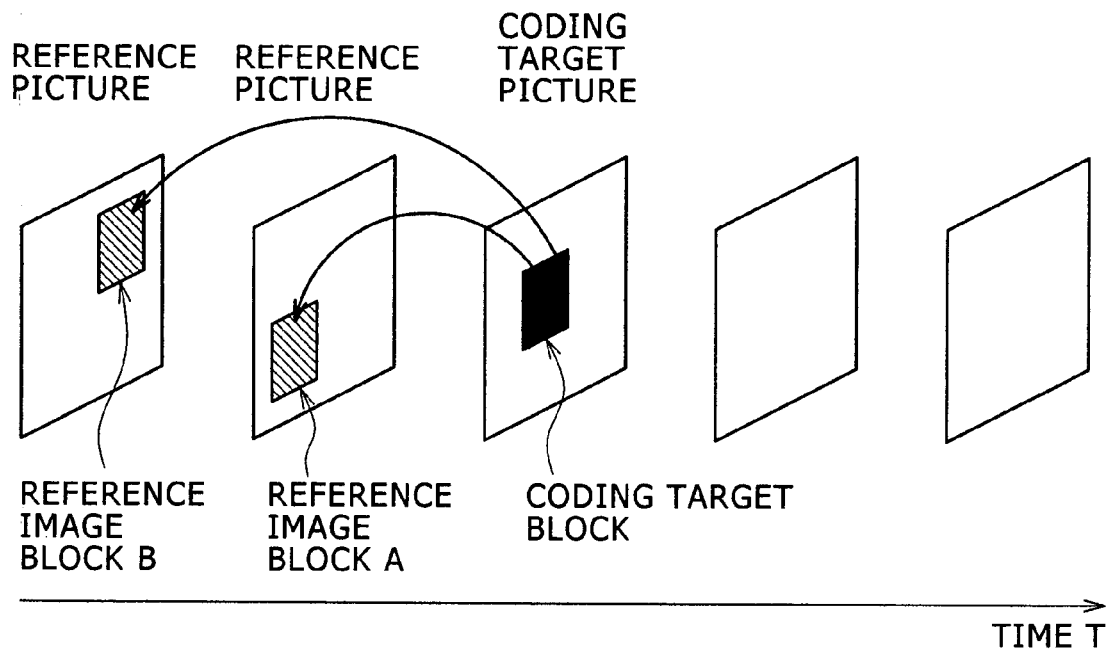
FIG. 14 is an explanatory view showing a bi-prediction operation in H. 264/AVC.
Figure 15:
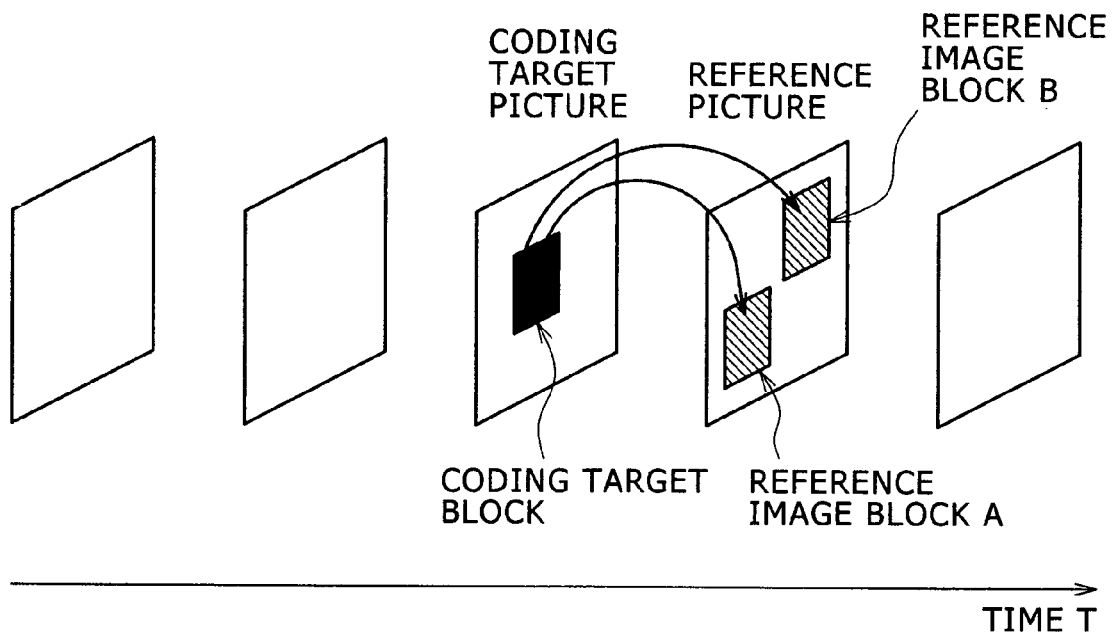
FIG. 15 is an explanatory view showing a bi-prediction operation in H. 264/AVC.

In the prediction using two reference image blocks, MPEG-2 employs a technique called "bi-directional prediction", as shown in FIG. 13, in which one reference image block in the previous reference picture on the temporal axis and one reference image block in the subsequent reference picture on the temporal axis are referred to for a coding target block in a coding target picture, and the mean value of these two reference image blocks is used as a reference image block. H. 264/AVC expands the bi-directional prediction of MPEG-2 to enable a prediction in which a reference image block is selected for use from each of two reference pictures in the same direction as shown in FIG. 14, or a prediction in which two reference image blocks are selected for use from the same reference picture as shown in FIG. 15. The prediction allows for a selection of two reference image blocks from the arbitrary reference picture(s) irrespective of the previous or subsequent reference picture without being bound by the constraint in which one previous picture on the temporal axis and one subsequent picture on the temporal axis are used. Therefore, such a prediction is distinguished from the conventional "bi-directional prediction", and is called "bi-prediction". For the convenience of explanation, each of two reference image blocks that are referred to in the bi-prediction is called "reference image block A" or "reference image block B". "Reference image block A" and "reference image block B" may be blocks which are present in the respective previous and subsequent reference pictures on the temporal axis with respect to a coding target image, or may be blocks which are present only in the previous reference picture or only in the subsequent picture. However, for the purpose of simple explanation, a reference image block in the previous reference picture on the temporal axis is allocated to the reference image block A and a reference image block in the subsequent reference picture on the temporal axis is allocated to the reference image block B as shown in FIG. 13.

As a counterpart of the bi-prediction, a technique in which the motion compensation inter prediction coding is performed using only one reference picture will be called "uni-directional prediction" below. In the following description, an image block that is referred to for P slice is the reference image block A.

As block sizes by which the motion compensation inter prediction coding is performed in H. 264/AVC, four kinds of (1) 16×16 to (4) 8×8 are available, and further, when the block size of (4) 8×8 is selected, three kinds of (5) 8×4 to (7) 4×4 are available for each block of 8 pixels×8 pixels, as shown in FIG. 16. Thus, seven kinds of block sizes in total are available.

As described above, for P slice in H. 264/AVC, a compression ratio can be increased by selecting the optimum coding mode from the motion compensation inter prediction coding mode (only the unidirectional prediction using the reference image block A) using the block sizes of seven kinds in total and the intra prediction coding mode. For B slice in H. 264/AVC, a compression ratio can be increased by selecting the optimum coding mode from the motion compensation inter prediction coding mode (three kinds of the unidirectional prediction using the reference image block A, the unidirectional prediction using the reference image block B, and the bi-prediction using the reference image block A and the reference image block B) using the block sizes of seven kinds in total and the intra prediction coding mode.

In the simplified (non-RD-opt) system, a coding cost is calculated as shown in the formula (1) in which an error between an original image and a prediction image is Hadamard-transformed, and SATD (Sum of Absolute Transformed Difference) obtained by adding the absolute values of respective transformed coefficients to each other is added to a bias value (Bias) that is set for each coding mode.

$$\text{Cost} = \text{SATD} + \text{Bias} \tag{1}$$

On the other hand, in the RD-opt system, a Lagrange multiplier is used for calculation of the coding cost. The coding cost is calculated by using SSD (Sum of Square Difference) that is a sum of square difference between an original image and a prediction image, a rate section R, and a Lagrange parameter $\lambda_{MODE}$ as shown in the formula (2). The rate section is a total coding amount in a selected coding mode. The Lagrange parameter is a value obtained from a relation between a coding amount and a quantization parameter (QP) in the case where various test images having different features are coded.

$$\text{Cost} = \text{SSD} + \lambda_{MODE} * R \text{ (where } \lambda_{MODE} = 0.85 * 2^{(QP-12)/3}) \tag{2}$$

The RD-opt system and the simplified (non-RD-opt) system will be described below using FIG. 10.

Figure 10:
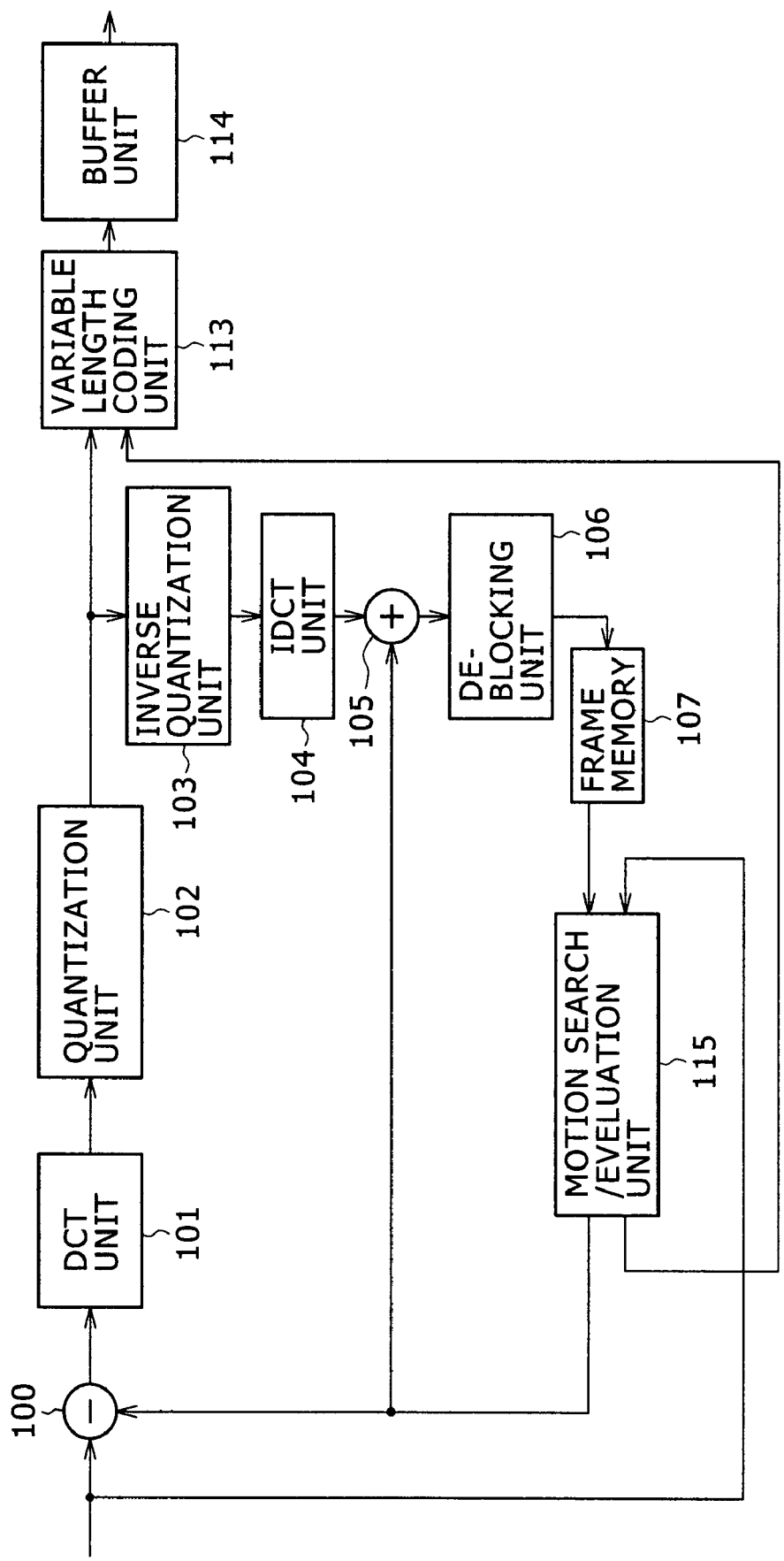
FIG. 10 is a configuration block diagram of a conventional image coding apparatus.
Figure 11:
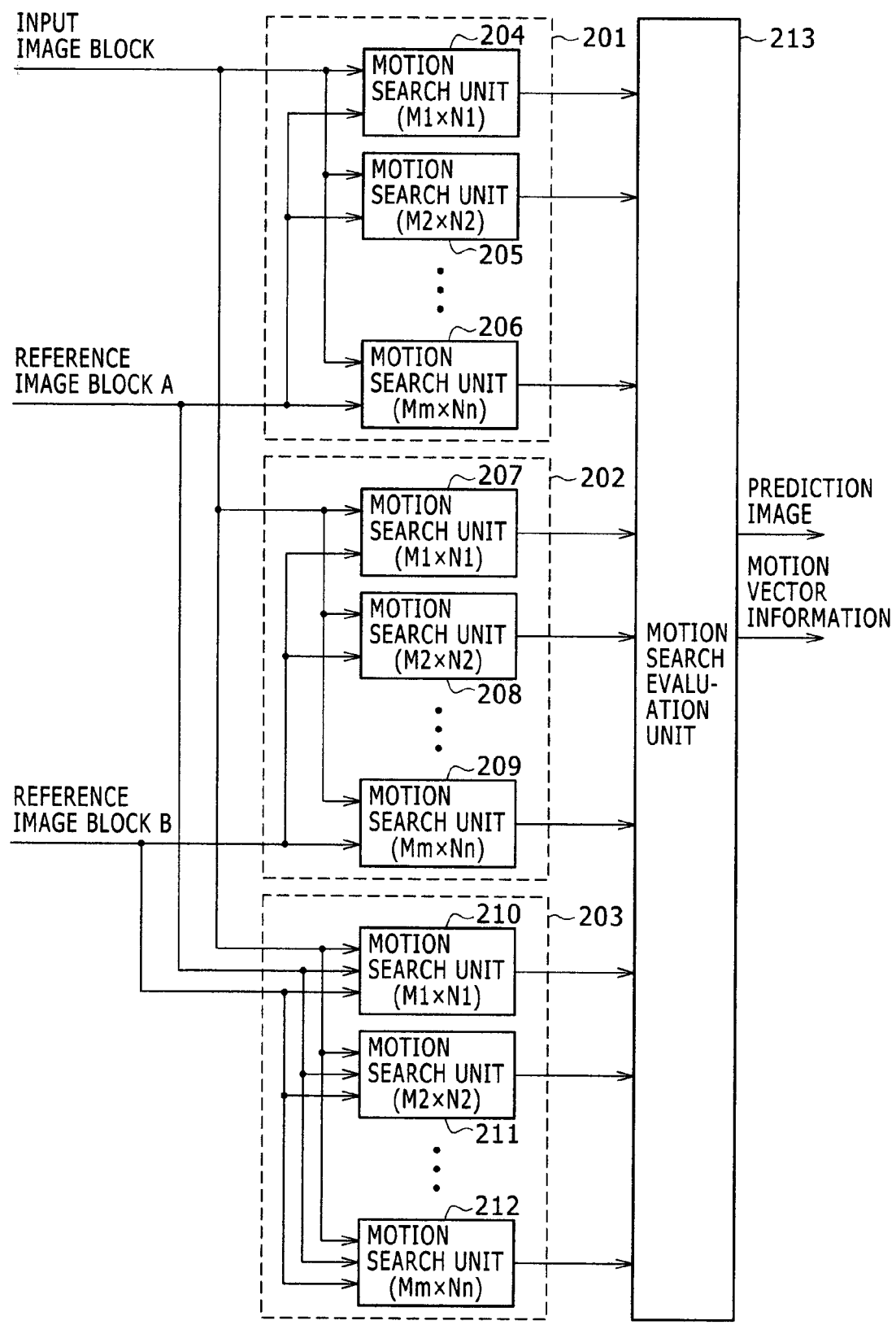
FIG. 11 is a configuration block diagram showing in detail a motion search unit in FIG. 10.

FIG. 10 is a view showing a conventional coding apparatus, and FIG. 11 is a view showing a detailed operation of a motion search/evaluation unit (115) in FIG. 10. Respective units in FIG. 10 other than the motion search/evaluation unit (115) have the same functions as those in FIG. 1 that are to be described later, and therefore, the detailed explanation thereof will be described later.

In FIG. 11, the reference numeral (201) denotes a unidirectional prediction motion search unit where the reference image block A serves as a reference image, the reference numeral (202) denotes a unidirectional prediction motion search unit where the reference image block B serves as a reference image, and the reference numeral (203) denotes a bi-prediction motion search unit where the reference image block A and the reference image block B serve as reference images. The reference numerals (204),(205), and (206) denote motion search units which perform a motion search by block sizes of M1×N1, M2×N2, and Mm×Nn, respectively, in the unidirectional prediction motion search unit (201) where the reference image block A serves as a reference image. As similar thereto, the reference numerals (207),(208), and (209) denote motion search units which perform a motion search by block sizes of M1×N1, M2×N2, and Mm×Nn, respectively, in the unidirectional prediction motion search unit (202) where the reference image block B serves as a reference image. Further, the reference numerals (210),(211), and (212) denote motion search units which perform a motion search by block sizes of M1×N1, M2×N2, and Mm×Nn, respectively, in the bi-prediction motion search unit (203) where the reference image block A and the reference image block B serve as reference images. The reference numeral (213) denotes a motion search evaluation unit which determines a prediction direction and a block size with the minimum coding cost from the results of the motion searches in the respective motion search units (204) to (212). Here, in the case of P slice, since only the reference image block A is used, a motion search process is performed by only the motion search unit (201), and motion search processes by the motion search units (202) and (203) are unnecessary. On the other hand, in the case of B slice, motion search processes by the motion search units (202) and (203) are performed at the same time, which results in enormous amounts of arithmetic processing as compared to the case of P slice.

Hereinafter, embodiments of the present invention will be described with reference to FIG. 1.

First Embodiment

Figure 1:
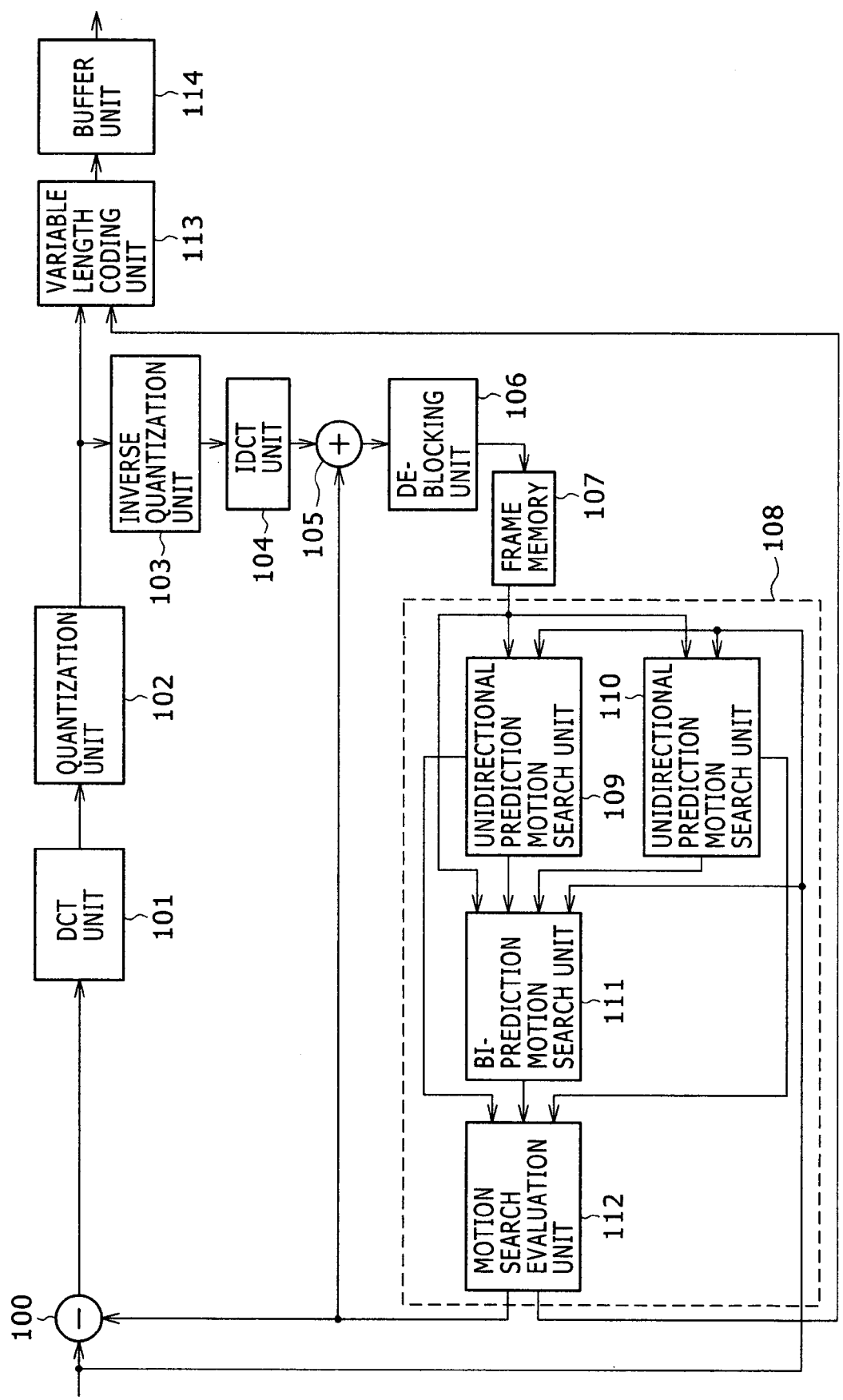
FIG. 1 is a configuration block diagram of an image coding apparatus according to a first embodiment of the present invention.

FIG. 1 is a configuration block diagram of an image coding apparatus according to a first embodiment of the present invention. The image coding apparatus shown in FIG. 1 includes a subtractor (100), a DCT unit (101), a quantization unit (102), an inverse quantization unit (103), an IDCT unit (104), an adder (105), a deblocking unit (106), a frame memory (107), a motion search/evaluation unit (108), a variable length coding unit (113), and a buffer unit (114). Among these units, the motion search/evaluation unit (108) includes unidirectional prediction motion search units (109) and (110), a bi-prediction motion search unit (111), and a motion search evaluation unit (112). The respective units may be constituted by hardware or software. Alternatively, the respective units may be modules obtained by combining hardware and software. As for the respective units in FIG. 1, blocks given the same numerals as those in the conventional image coding apparatus shown in FIG. 10 have the same functions.

An operation of the image coding apparatus shown in FIG. 1 will be described below. A video signal is divided by an image block division unit (not shown). A subtraction process using the divided input image blocks and reference image blocks that are output from the motion search/evaluation unit (108), to be described later, is performed by the subtractor (100). The DCT unit (101) performs orthogonal transform for a differential image signal output from the subtractor (100) on an image block basis, and outputs the resultants to the quantization unit (102). The quantization unit (102) quantizes the input DCT-transformed data. The quantized data is input to the variable length coding unit (113). The input data is variable-length-coded by the variable length coding unit (113). The variable-length-coded data is temporarily stored in the buffer unit (114). The buffer unit (114) outputs the input coded data in accordance with a transmission line.

On the other hand, the quantized data generated by the quantization unit (102) is input to the inverse quantization unit (103). The inverse quantization unit (103) inverse-quantizes the quantized data. The inverse-quantized image block data is input to the IDCT unit (104). The IDCT unit (104) performs inverse orthogonal transform for the data so as to decompress as differential blocks. The decompressed differential blocks are used for generating a local decompression image through the adder (105), and the local decompression image is stored in the frame memory (107) through the deblocking unit (106). The deblocking unit (106) performs a filtering process to minimize block distortion generated at the time of image coding. The local decompression image stored in the frame memory (107) is read as a reference image when the inter prediction coding is performed for the input image, and is input to the motion search/evaluation unit (108). The motion search/evaluation unit (108) performs a motion search for the image blocks of the input video signal, with the image read from the frame memory (107) as a reference image, and determines a block size and a motion vector with the minimum coding cost. The reference image block corresponding to the block size and the motion vector selected by the motion search/evaluation unit (108) is supplied to the subtractor (100). Further, the motion vector information selected by the motion search/evaluation unit (108) is supplied to the variable length coding unit (113), and is variable-length-coded together with the quantized data output from the quantization unit (102).

Figure 2:
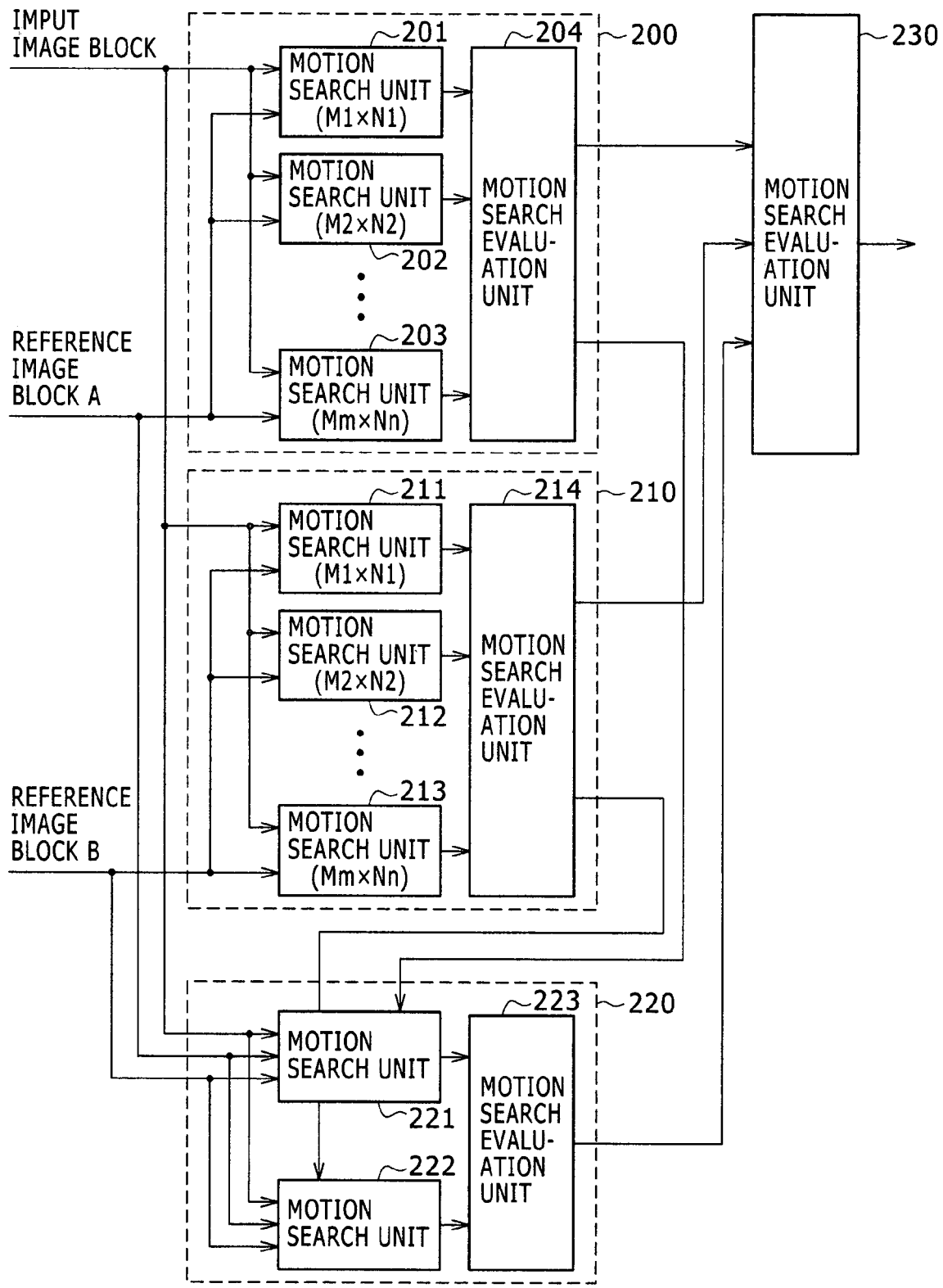
FIG. 2 is a configuration block diagram showing in detail a motion search unit according to the first embodiment of the present invention.

FIG. 2 is a view explaining an operation of the motion search/evaluation unit (108) in more detail. In FIG. 2, the reference numeral (200) denotes a unidirectional prediction motion search unit where the reference image block A serves as a reference image, the reference numeral (210) denotes a unidirectional prediction motion search unit where the reference image block B serves as a reference image, and the reference numeral (220) denotes a bi-prediction motion search unit where the reference image block A and the reference image block B serve as reference images. The reference numeral (230) denotes a motion search evaluation unit which determines an inter prediction coding mode, a block size, and a motion vector with the minimum coding cost among the unidirectional prediction motion search unit (200), the unidirectional prediction motion search unit (210), and the bi-prediction motion search unit (220).

The reference numerals (201),(202), and (203) in the unidirectional prediction motion search unit (200) denote motion search units which perform a motion search by block sizes of M1×N1, M2×N2, and Mm×Nn, respectively, in a motion search in which the reference image block A serves as a reference image. A motion search evaluation unit (204) determines a block size and a motion vector with the minimum coding cost among the motion search units (201) to (203), and outputs the block size and the motion vector together with the minimum coding cost to the motion search evaluation unit (230). Further, the motion search evaluation unit (204) outputs the determined block size to the bi-prediction motion search unit (220). As similar thereto, the reference numerals (211),(212), and (213) in the unidirectional prediction motion search unit (210) denote motion search units which perform a motion search by block sizes of M1×N1, M2×N2, and Mm×Nn, respectively, in a motion search in which the reference image block B serves as a reference image. A motion search evaluation unit (214) determines a block size and a motion vector with the minimum coding cost among the motion search units (211) to (213), and outputs the block size and the motion vector together with the minimum coding cost to the motion search evaluation unit (230). Further, the motion search evaluation unit (214) outputs the determined block size to the bi-prediction motion search unit (220).

In the bi-prediction motion search unit (220), a motion search unit (221) performs a bi-prediction motion search on the basis of a block size notified by the unidirectional prediction motion search unit (200) using the reference image block A. A motion search unit (222) performs a bi-prediction motion search on the basis of a block size notified by the unidirectional prediction motion search unit (210) using the reference image block B. A motion search evaluation unit (223) determines a block size and a motion vector with a smaller coding cost between the bi-prediction motion search unit (221) and the bi-prediction motion search unit (222), and outputs the block size and the motion vector together with the smaller coding cost to the motion search evaluation unit (230).

As described above, in the image coding apparatus according to the first embodiment of the present invention, block sizes by which a bi-prediction motion search is performed are limited to two sizes, namely, a block size selected in a motion search of the unidirectional prediction using the reference image block A and a block size selected in a motion search of the unidirectional prediction using the reference image block B. Therefore, a coding process necessary for the bi-prediction motion search can be effectively reduced. In the invention, since a block size used for the bi-prediction search is determined on the basis of a block size selected in the motion search of the unidirectional prediction, the coding efficiency can be also kept as high as possible.

Second Embodiment

Figure 3:
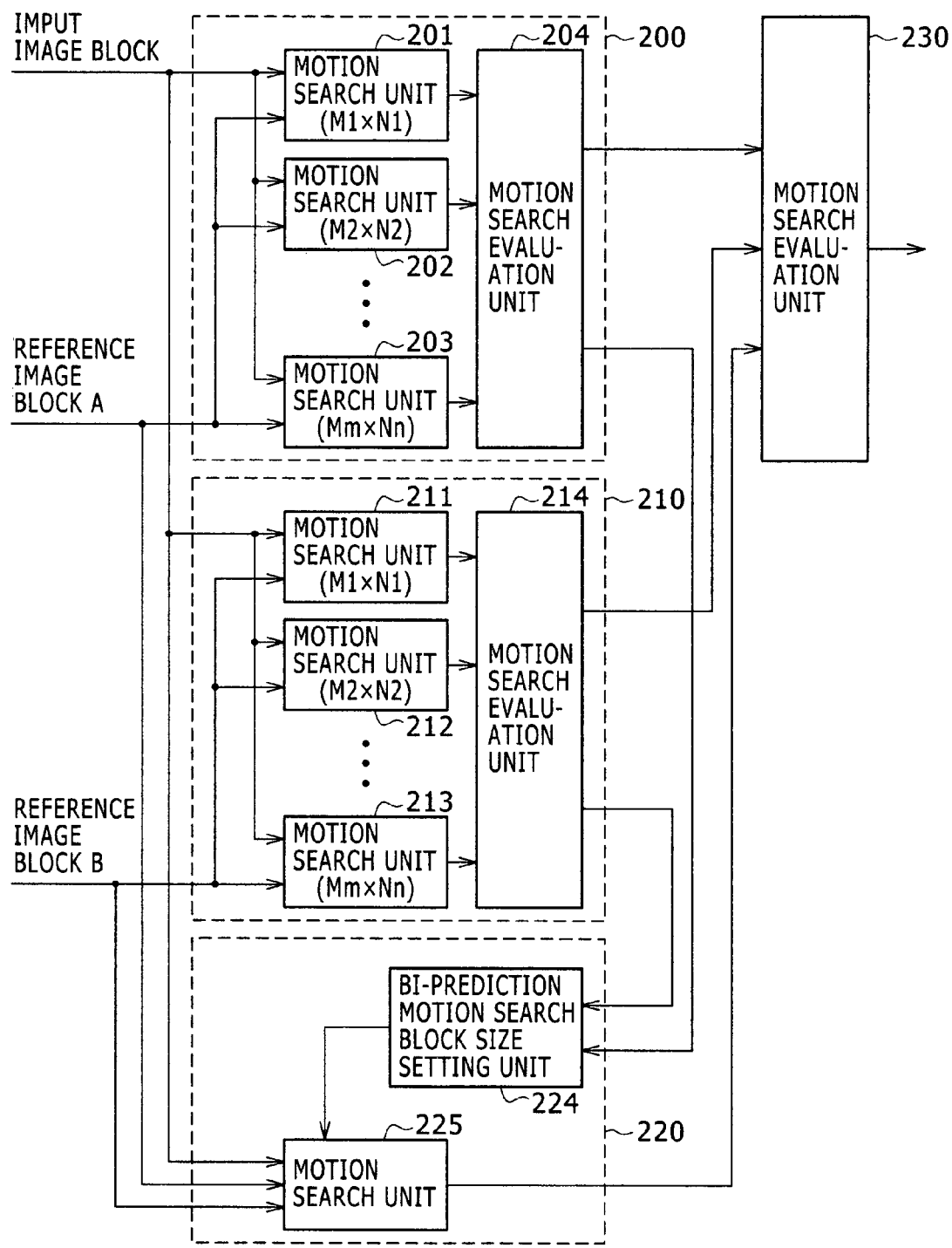
FIG. 3 is a configuration block diagram showing in detail a motion search unit according to a second embodiment of the present invention.

Next, a second embodiment of the present invention will be described. A configuration block diagram of an image coding apparatus according to the second embodiment of the present invention is the same as that of FIG. 1 in the first embodiment, and therefore the explanation thereof is omitted. Hereinafter, an operation of the motion search/evaluation unit (108) will be described with reference to FIG. 3. The unidirectional prediction motion search units (200) and (210), and the motion search evaluation unit (230) in FIG. 3 are the same as those in FIG. 2, and therefore the explanation thereof is omitted. In the bi-prediction motion search unit (220), a bi-prediction motion search block size setting unit (224) determines a block size by which a bi-prediction search is performed from block sizes notified by the unidirectional prediction motion search unit (200) and the unidirectional prediction motion search unit (210). A motion search unit (225) performs a bi-prediction motion search on the basis of a block size notified by the bi-prediction motion search block size setting unit (224), and outputs a motion vector with the minimum coding cost and the coding cost to the motion search evaluation unit (230).

There will be shown below a concrete example of determining a block size in the bi-prediction motion search block size setting unit (224). When a block size notified by the unidirectional prediction motion search unit (200) is $M_A \times N_A$ and a block size notified by the unidirectional prediction motion search unit (210) is $M_B \times N_B$, a block size $M_C \times N_C$ by which a bi-prediction is performed is obtained in the following manner.

$$M_C = \text{GCM}(M_A, M_B), N_C = \text{GCM}(N_A, N_B) \qquad (3)$$

In the formula (3), GCM (a, b) is a function by which the greatest common measure between "a" and "b" is obtained.

As described above, in the image coding apparatus according to the second embodiment of the present invention, block sizes by which a bi-prediction motion search is performed are limited to one size from the search result of the unidirectional prediction using the reference image block A and the search result of the unidirectional prediction using the reference image block A. Therefore, a coding process necessary for the bi-prediction motion search can be effectively reduced. As for a block size used for a bi-prediction search in the present invention, when a block size selected in a unidirectional prediction using the reference image block A is equal to that selected in a unidirectional prediction using the reference image block B, a block size selected in a bi-prediction is also the same as that selected in the unidirectional prediction. Further, even when a block size selected in a unidirectional prediction using the reference image block A is different from that selected in a unidirectional prediction using the reference image block B, a block size of the greatest common measure between both the block sizes is selected (for example, when a block size of 16×16 is selected in the reference image block A and a block size of 16×8 is selected in the reference image block B, a block size of 16×8 is set in the bi-prediction motion search). Therefore, since a block size with the minimum coding cost in the unidirectional prediction can be reflected as much as possible as a block size at the time of the bi-prediction motion search, the coding efficiency can be also kept as high as possible.

For the operation of the bi-prediction motion search block size setting unit (224), there is shown in the second embodiment an example of a setting operation in which a bi-prediction motion search is performed by all combinations of a block size selected by the unidirectional prediction motion search unit (200) and a block size selected by the unidirectional prediction motion search unit (210). However, as another example, it is possible to set as, for example, FIG. 4.

Figure 4:
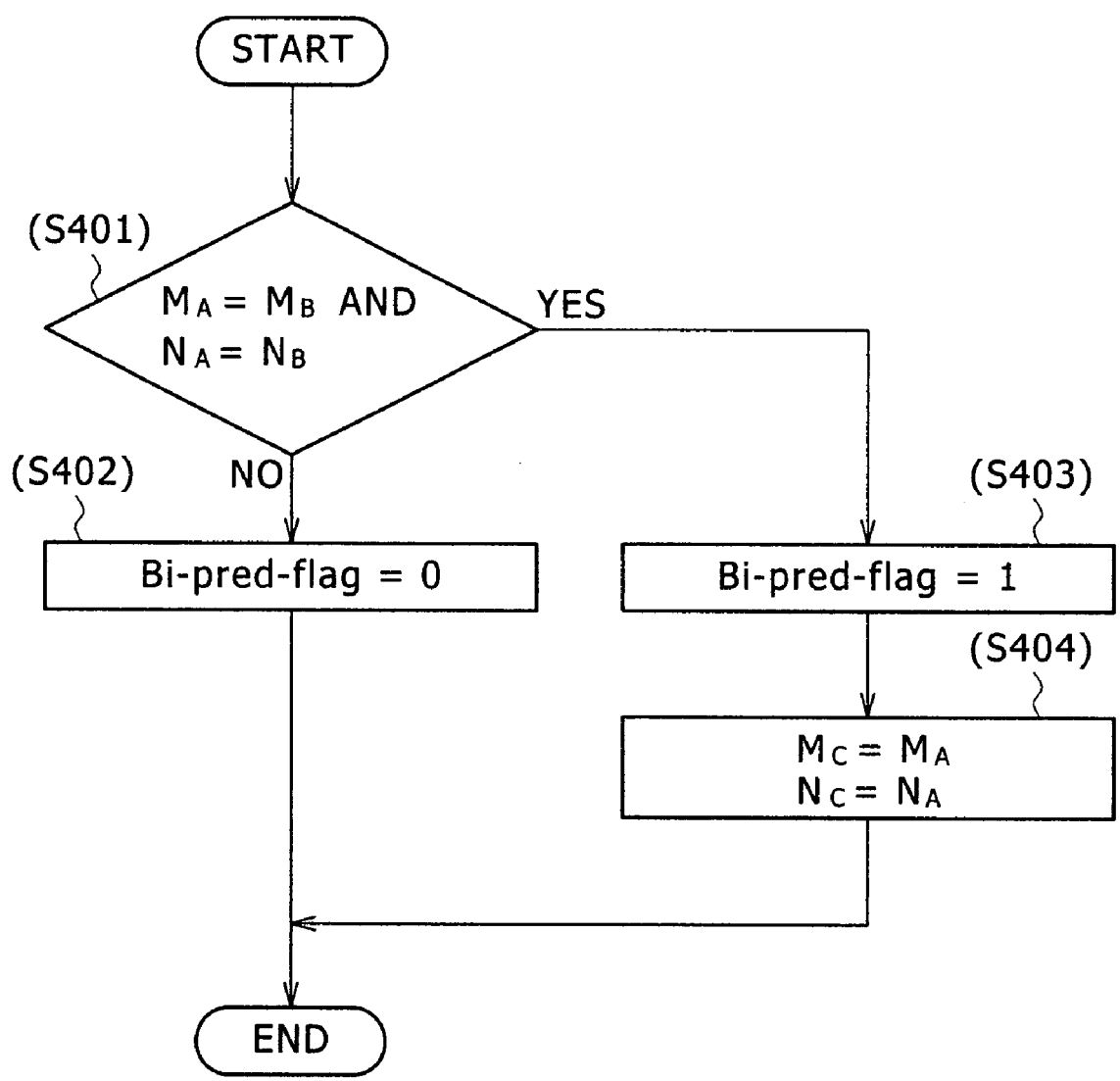
FIG. 4 is a flowchart showing a processing example of a bi-prediction motion search block size setting unit according to the second embodiment of the present invention.

In FIG. 4, it is determined whether or not a block size $(M_A \times N_A)$ notified by the unidirectional prediction motion search unit (200) is equal to a block size $(M_B \times N_B)$ notified by the unidirectional prediction motion search unit (210) (S401 in FIG. 4). If the block size $(M_A \times N_A)$ is equal to the block size $(M_B \times N_B)$ in the determination of S401 (in the case of "YES" in S401 of FIG. 4), a discrimination flag (Bi-pred-flag) for indicating whether or not a bi-prediction motion search is performed is set to 1 (S403 in FIG. 4). Next, a block size $(M_C \times N_C)$ for a bi-prediction motion search is set (S404 in FIG. 4). On the other hand, if the block size $(M_A \times N_A)$ is not equal to the block size $(M_B \times N_B)$ in the determination of S401 (in the case of "NO" in S401 of FIG. 4), the discrimination flag (Bi-pred-flag) for indicating whether or not a bi-prediction motion search is performed is set to 0 (S402 in FIG. 4) and the flow is terminated. The bi-prediction motion search unit (225) in FIG. 3 refers to the discrimination flag (Bi-pred-flag), and if the flag is 1, a bi-prediction motion search is performed by the block size $(M_C \times N_C)$. On the other hand, if the discrimination flag (Bi-pred-flag) is 0, a bi-prediction motion search is not performed. In this case, the motion search evaluation unit (230) determines an inter prediction coding mode, a block size, and a motion vector with the minimum coding cost between the unidirectional prediction motion search unit (200) and the unidirectional prediction motion search unit (210).

In the above-described example, only when a block size selected by the unidirectional prediction motion search unit (200) is equal to that selected by the unidirectional prediction motion search unit (210), a bi-prediction motion search is performed. Therefore, a coding process necessary for the bi-prediction motion search can be further reduced.

Third Embodiment

Figure 5:
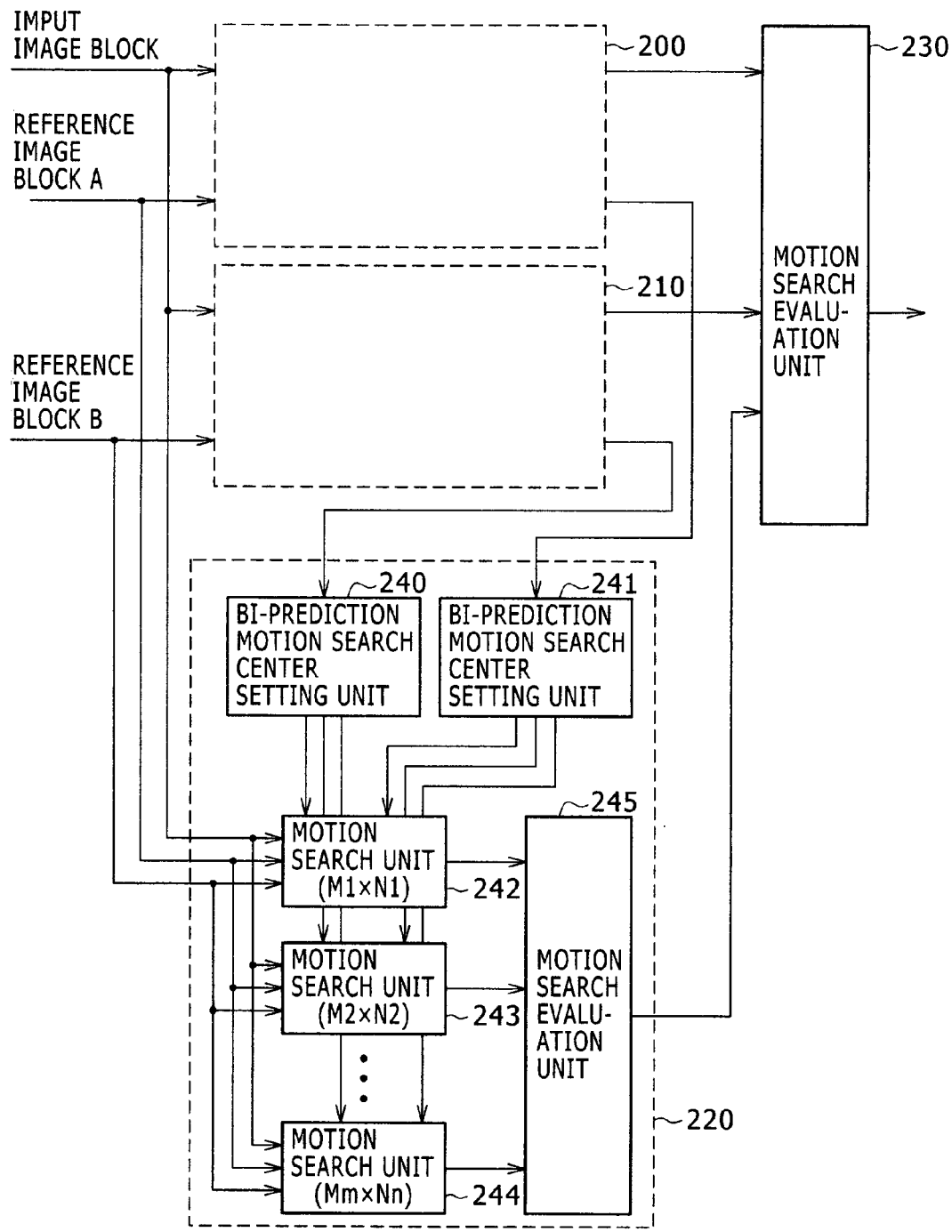
FIG. 5 is a configuration block diagram showing in detail a motion search unit according to a third embodiment of the present invention.

Next, a third embodiment of the present invention will be described. A configuration block diagram of an image coding apparatus according to the third embodiment of the present invention is the same as that of FIG. 1 in the first embodiment, and therefore the explanation thereof is omitted. Hereinafter, an operation of the motion search/evaluation unit (108) will be described with reference to FIG. 5. The unidirectional prediction motion search units (200) and (210), and the motion search evaluation unit (230) in FIG. 5 are the same as those in FIG. 2, and therefore the explanation thereof is omitted. In the bi-prediction motion search unit (220), a bi-prediction motion search center setting unit (241) sets a search center in a motion search within a reference picture to which the reference image block A belongs when performing a bi-prediction motion search, on the basis of a motion vector selected by the unidirectional prediction motion search unit (200) where the reference image block A serves as a reference image. A bi-prediction motion search center setting unit (240) sets a search center in a motion search within a reference picture to which the reference image block B belongs when performing a bi-prediction motion search, on the basis of a motion vector selected by the unidirectional prediction motion search unit (210) where the reference image block B serves as a reference image. The reference numerals (242) to (244) denote motion search units which perform a motion search by block sizes of M1×N1, M2×N2, and Mm×Nn, respectively, with search centers notified by the bi-prediction motion search center setting units (240) and (241) as centers. A motion search evaluation unit (245) determines a block size and a motion vector with the minimum coding cost among the motion search units (242) to (244), and outputs the block size and the motion vector together with the minimum coding cost to the motion search evaluation unit (230).

An operation of the bi-prediction motion search center setting unit (241) will be described below in more detail. As shown in FIG. 16, seven kinds of block sizes such as 16×16 to 4×4 are available in H. 264/AVC. However, for the purpose of simple explanation, there is exemplified a case in which four kinds of block sizes such as (1) 16×16 to (4) 8×8 among the block sizes in FIG. 16 are applied. In the case where a plurality of blocks are present in one MB, block numbers of 0 to 3 are given in the block sizes (1) to (4) in FIG. 16 for discrimination of each block. When the block size is 16×16, the block number is only 0. When the block size is 16×8, two upper and lower 16×8 blocks are present in one MB. Therefore, the block number of the upper block is 0 and the block number of the lower block is 1. As similar thereto, when the block size is 8×16, two left and right 8×16 blocks are present in one MB. Therefore, the block number of the left block is 0 and the block number of the right block is 1. When the block size is 8×8, four 8×8 blocks are present in one MB. Therefore, the block number of the upper-left block is 0, the block number of the upper-right block is 1, the block number of the lower-left block is 2, and the block number of the lower-right block is 3.

FIG. 6 shows an operation example in which a search center point is set when a motion search is performed by the bi-prediction motion search units (242) to (244) in the case where a block size selected by the unidirectional prediction motion search unit (200) is 16×16, a motion vector (x, y) is (MV0x, MV0y), and the block number is 0.

Further, FIG. 7 shows an operation example in which a search center point is set when a motion search is performed by the bi-prediction motion search units (242) to (244) in the case where a block size selected by the unidirectional prediction motion search unit (200) is 16×8, a motion vector (x, y) is (MV1x, MV1y) in the block number 0, and a motion vector (x, y) is (MV2x, MV2y) in the block number 1. In FIG. 7, the followings are satisfied.

$$MVavelx=(MV1x+MV2x)/2$$

$$MVavely=(MV1y+MV2y)/2$$

Furthermore, FIG. 8 shows an operation example in which a search center point is set when a motion search is performed by the bi-prediction motion search units (242) to (244) in the case where a block size selected by the unidirectional prediction motion search unit (200) is 8×16, a motion vector (x, y) is (MV3x, MV3y) in the block number 0, and a motion vector (x, y) is (MV4x, MV4y) in the block number 1. In FIG. 8, the followings are satisfied.

$$MVave2x=(MV3x+MV4x)/2$$

$$MVave2y=(MV3y+MV4y)/2$$

Furthermore, FIG. 9 shows an operation example in which a search center point is set when a motion search is performed by the bi-prediction motion search units (242) to (244) in the case where a block size selected by the unidirectional prediction motion search unit (200) is 8×8, a motion vector (x, y) is (MV5x, MV5y) in the block number 0, a motion vector (x, y) is (MV6x, MV6y) in the block number 1, a motion vector (x, y) is (MV7x, MV7y) in the block number 2 and a motion vector (x, y) is (MV8x, MV8y) in the block number 3. In FIG. 9, the followings are satisfied.

$$MVave3x=(MV5x+MV6x+MV7x+MV8x)/4$$

$$MVave3y=(MV5y+MV6y+MV7y+MV8y)/4$$

$$MVave4x=(MV5x+MV6x)/2$$

$$MVave4y=(MV5y+MV6y)/2$$

$$MVave5x=(MV7x+MV8x)/2$$

$$MVave5y=(MV7y+MV8y)/2$$

$$MVave6x=(MV5x+MV7x)/2$$

$$MVave6y=(MV5y+MV7y)/2$$

$$MVave7x=(MV6x+MV8x)/2$$

$$MVave7y=(MV6y+MV8y)/2$$

In the above, the operation of the bi-prediction motion search center setting unit (241) is described, however, the operation of the bi-prediction motion search center setting unit (240) is also the same.

As described above, in the image coding apparatus according to the third embodiment of the present invention, a search center point when performing a bi-prediction motion search is set on the basis of the result of the unidirectional prediction motion search. Therefore, it is possible to set the search range at the time of the bi-prediction motion search smaller than that at the time of the unidirectional prediction motion search. Thereby, a coding process necessary for the bi-prediction motion search can be effectively reduced. Further, in the present invention, since a search center point for the bi-prediction search is determined on the basis of motion vector information selected in a motion search of the unidirectional prediction, the coding efficiency can be also kept as high as possible.

By combining the image coding apparatuses described in the first and second embodiments and that described in the third embodiment, specifically, even by employing a technique for determining a block size and a motion search center point when performing a bi-prediction motion search from the result of a motion search of the unidirectional prediction, the same effect can be obtained.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image coding apparatus for coding an image, comprising:
   a frame memory for storing a reference image including first and second coded reference image blocks;
   a first prediction motion search unit, coupled to an output of the frame memory, which computes, for a plurality of different coded reference image block sizes, coding cost information for coding on basis of the first and second coded reference image blocks, and outputs first and third coding cost information including information on a block size of the plurality of different coded reference image block sizes with minimum coding cost; and
   a second prediction motion search unit, coupled to the output of the frame memory and an output of the first prediction motion search unit, which outputs second coding cost information for coding on the basis of the first and second coded reference image blocks by using the first and third coding cost information, including information on the block size, output from the first prediction motion search unit; and
   one or more image coding units, which perform coding of the image by using the first coding cost information, the second coding cost information, and the third coding cost information,
   wherein the first prediction motion search unit comprises:
       a first unidirectional prediction motion search unit configured to perform motion searches for a first unidirectional prediction motion in the plurality of different image block sizes having units of n (n is 1 or larger) using the first coded reference image block, and to output the first coding cost information including a first minimum coding cost, a first motion vector, and a first block size of the plurality of different image block sizes with minimum coding cost for coding the image on the basis of the first coded reference image block; and
       a second unidirectional prediction motion search unit configured to perform motion searches for a second unidirectional prediction motion in the plurality of different image block sizes having units of n (n is 1 or larger) using the second coded reference image block that is different from the first coded reference image block, and to output the third coding cost information including a second minimum coding cost, a second motion vector, and a second block size of the plurality of different image block sizes with minimum coding cost for coding the image on the basis of the second coded reference image block, and
   wherein the second prediction motion search unit selects one of the first and second block sizes for coding on the basis of the first and second coded reference image blocks by comparing the first coding cost information and the third coding cost information.

2. An image coding method for coding an image, comprising steps of:
   retrieving first and second coded reference image blocks from a frame memory storing a reference image including coded reference image blocks;
   searching a first prediction motion to compute, for a plurality of different coded reference image block sizes, coding cost information for coding on basis of the retrieved first and second coded reference image blocks, and to output first and third coding cost information including information on a block size of the plurality of different coded reference image block sizes with minimum coding cost;

searching a second prediction motion to output second coding cost information for coding on the basis of the retrieved first and second coded reference image blocks by using the first and third coding cost information, including information on the block size, output in the first prediction motion search step; and coding the image by using the first coding cost information, the second coding cost information, and the third coding cost information, wherein the step of searching the first prediction motion comprises steps of:

performing motion searches for a first unidirectional prediction motion in the plurality of different image block sizes having units of n (n is 1 or larger) using the first coded reference image block, and outputting the first coding cost information including a first minimum coding cost, a first motion vector, and a first block size of the plurality of different image block sizes with minimum coding cost for coding the image on the basis of the first coded reference image block; and performing motion searches for a second unidirectional prediction motion in the plurality of different image block sizes having units of n (n is 1 or larger) using the second coded reference image block that is different from the first coded reference image block, and outputting the third coding cost information including a second minimum coding cost, a second motion vector, and a second block size of the plurality of different image block sizes with minimum coding cost for coding the image on the basis of the second coded reference image block, and wherein the step of searching the second prediction motion comprises selecting one of the first and second block sizes for coding on the basis of the first and second coded reference image blocks by comparing the first coding cost information and the third coding cost information.

* * * * *